Nov. 28, 1961 W. C. SPROULL, JR 3,010,681
AUTOMATIC REACTION CONTROL SYSTEM FOR AIRCRAFT
Filed March 24, 1958 5 Sheets-Sheet 1

INVENTOR.
WM.C. SPROULL
BY
ATTORNEY

Nov. 28, 1961   W. C. SPROULL, JR   3,010,681
AUTOMATIC REACTION CONTROL SYSTEM FOR AIRCRAFT
Filed March 24, 1958   5 Sheets-Sheet 4

Fig. 7

INVENTOR.
WM. C. SPROULL
BY Gordon Reed
ATTORNEY

FIG. 8

United States Patent Office 3,010,681
Patented Nov. 28, 1961

3,010,681
AUTOMATIC REACTION CONTROL SYSTEM
FOR AIRCRAFT
William C. Sproull, Jr., Minneapolis, Minn., assignor to Minneapolis-Honeywell Regulator Company, Minneapolis, Minn., a corporation of Delaware
Filed Mar. 24, 1958, Ser. No. 723,341
19 Claims. (Cl. 244—77)

This invention relates to reaction flight control systems for dirigible craft such as aircraft. Such reaction control system utilizes the thrust derived from a controlled jet or stream to exert a thrust on the craft tending to change its attitude about an axis either during flight or in static tests on a support. The type of aircraft controlled may be a conventional aircraft or also may be a guided missile which may be capable of varying or adjusting the path of its flight in response to signals. The reaction control system is utilized primarily when the craft to be controlled operates in a medium having low or zero dynamic pressures.

When operated in a conventional aircraft, the reaction control system may be used in flight to augment the aerodynamic control surfaces at very low dynamic pressures, particularly at extreme altitudes.

The subject reaction control system may utilize any of a number of reaction devices one being small rocket motors that exert moments in the proper direction. When used in this manner, a reaction control system is quite similar to its counterpart aerodynamic control system with the very important exception and that is that it requires rocket fuel in proportion to its duration of use. This demands economical use during all maneuvers.

Because of the very low aerodynamic damping or frictional resistance at low dynamic pressures, the dirigible craft or aircraft can be coasted from one attitude to another with only a momentary small initial thrust, thereby avoiding the necessity of utilizing rocket fuel all during the period of the change in attitude to effect such economical use.

The arrangement also includes a dual-mode automatic reaction control technique using on-off control for large amplitude attitude commands or disturbances in attitude from the trim attitude. Thus there is provided both the fuel saving qualities of on-off control plus the accuracy and smoothness of linear or proportional control.

While the one-off control is utilized until a desired attitude rate is attained and thereafter the aircraft is coasted from one attitude to another without increasing angular rate, additional means are provided so that the attitude rate at which coasting occurs may be varied with the magnitude of the attitude error in order to decrease the time to effect the desired change in attitude.

The structure by which the novel techniques of a dual-mode, velocity limited automatic reaction control is effected may be more clearly understood by reference to the following description taken in conjunction with the accompanying drawings of the invention.

Figure 1:
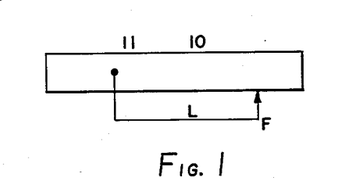
FIGURE 1 illustrates the application of a reactive force to a body, assuming rotational motion.

In connection with FIGURE 1, the forces acting on a body having rotational motion and the results of such forces may be considered. In FIGURE 1, a body 10 may have applied thereto a force F at a radius L from its axis of rotation 11. The product of force times distance L equals FL.

$$FL = I\alpha = I\ddot{\theta}$$

where $\ddot{\theta}$ is the angular acceleration of the member 10 about axis 11.

(1) $$\dot{\theta} = \ddot{\theta} \times T$$

where T=duration of the force.

(2) $$\theta = \dot{\theta} \times T$$

(3) $$\frac{\dot{\theta}}{\theta} = \frac{\ddot{\theta}}{\dot{\theta}}$$

(4) $$\ddot{\theta} = \frac{\dot{\theta}^2}{\theta}$$

(5) $$FL = I\frac{\dot{\theta}^2}{\theta}$$

(6) $$\dot{\theta}^2 = \frac{FL}{I} \times \theta$$

(7) $$\dot{\theta}^2 = K\theta$$

where $$K = \frac{FL}{I}$$

Equation 7 is a parabolic form of equation.

Figure 2:
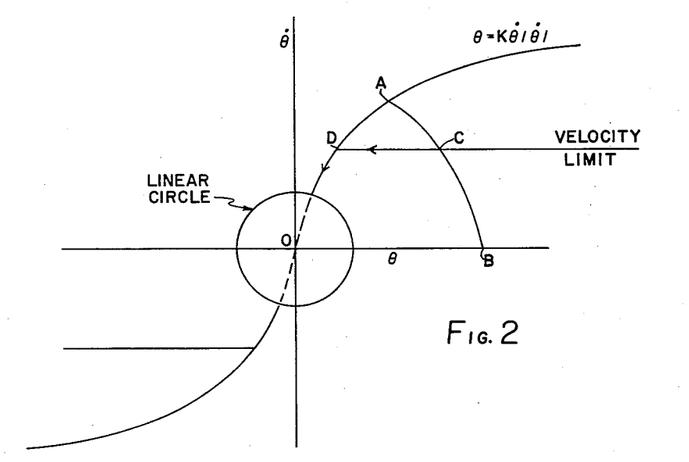
FIGURE 2 is a phase plane portrait of the relationship between attitude error as the abscissae and attitude rate as the ordinate of a body broadly similar to that in FIGURE 1 subject to a dual-mode reactive force.

Equation 7 may be considered graphically by reference to FIGURE 2. Viewing FIGURE 2 and beginning at the origin and assuming a force such as force F in FIGURE 1 acting on a rotational member and further assuming at the moment of application of the force F, which may be a reactive force, zero angular velocity of the body, then with the force applied the angular rate, $\dot{\theta}$, the ordinate of FIGURE 2, increases as attitude, $\theta$, the abscissae, increases to the right from the origin O. During this portion of rotation of body 10 an on-off control is utilized with the reactive force in the on position exerting the constant single value force or thrust.

Upon reflection, it will be clear that the curve in FIGURE 2 traced by the change in angular rate with the change in attitude conforms to equation 7.

If at the point A on the curve, we terminate thrust in the one direction and apply the thrust in the opposite direction to decelerate the member 10, the change in velocity as attitude continues to increase while velocity decreases is represented by the curve AB. Since at this time a constant thrust, F, is applied to the member 10 in the opposite direction, the curve AB is similar to the curve OA.

Suppose we next consider the control of a dirigible craft by a reaction type control of the above on-off type. In FIGURE 2, if the attitude error is equal to OB, a reactive thrust may be applied to reduce such attitude error. As the thrust is applied, the attitude error decreases as evident from curve BA. Additionally the angular rate increases as the ordinates for curve BA increase with decrease in attitude error. If, at the time an angular rate corresponding to that at point A is attained, we terminate the thrust in the initial direction and oppose it by an equal thrust in the opposite direction by a switching operation, it is clear in the on-off type of control, ideally, that while the attitude error continues to decrease, the attitude rate also continues to decrease along the line OA.

We may therefore consider the line OA a switching line. This is the line which determines what the angular rate shall be for a given attitude error and determines in which direction the reactive thrust should be.

By reference again to FIGURE 2, assume we again have an attitude error of OB. If we apply a thrust or reactive force tending to reduce the attitude error OB, the change in angular velocity or attitude rate will fall along the line BA. Suppose that we do not wish to utilize the reactive force during the entire total period of change in attitude. To this purpose, when the velocity rate reaches point C on curve BA, we may automatically terminate the application of the on-off thrust in the initial direction. The member or craft will continue to change attitude without increasing velocity rate. The decrease in attitude without increasing velocity rate may be considered graphically as taking place along the line CD of FIGURE 2.

At point D, an equal but opposite on-off thrust is applied to decrease the attitude rate while also decreasing the attitude error along the line BO.

Figure 5:
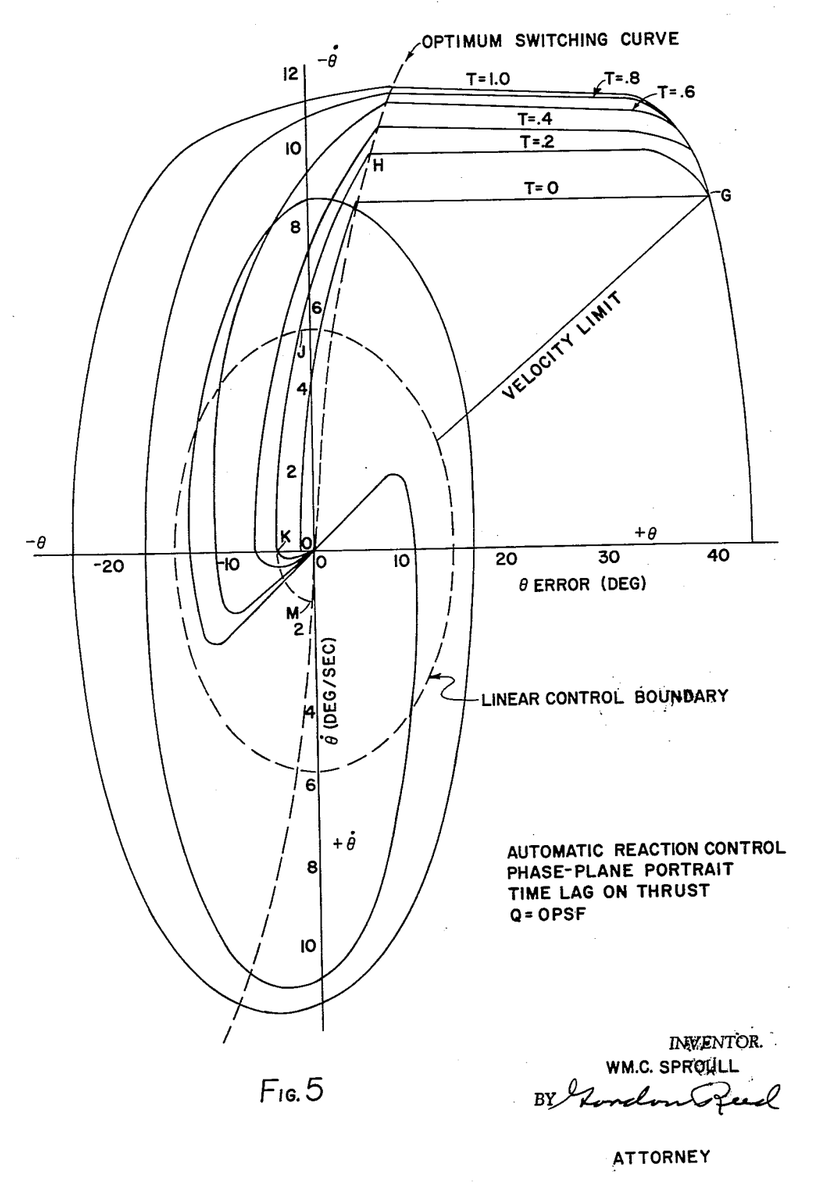
FIGURE 5 is an automatic reaction control phase-plane portrait at zero dynamic pressure but with various time lags on thrust.
Figure 6:
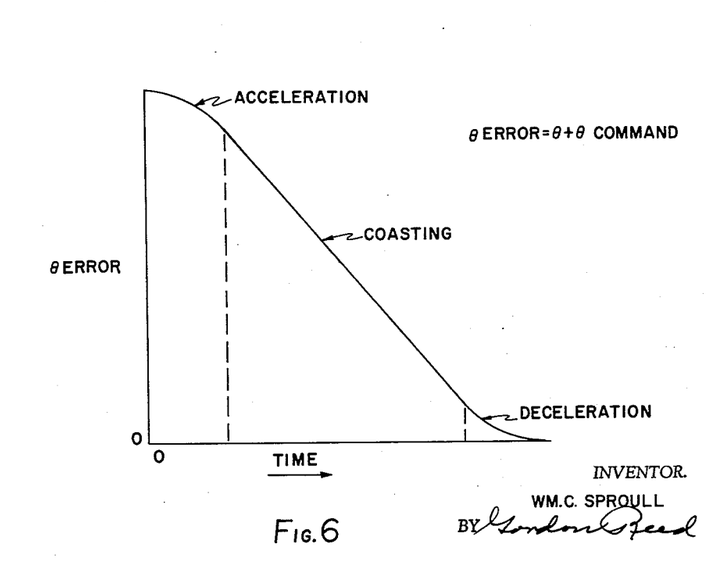
FIGURE 6 is a time history of a typical response to an attitude command.

FIGURE 2 includes a "linear circle" which may be more fully understood with reference to FIGURE 5. The circle has a selected radius. In FIGURE 5, attitude error is the abscissae and attitude rate is the ordinate, as in FIGURE 2. In FIGURE 5, a number of curves originate at the attitude error of about 44 degrees. Also FIGURE 5 shows the ideal response curve or switching curve in dashed line form.

It may be mentioned that since positive and negative values of attitude and positive and negative values of attitude rate are to be considered, the ideal curve will appear only in the first and third quadrants. Beginning at the attitude error of 44 degrees, the attitude error decreases as attitude rate increases to a point G. At point G a velocity limit is applied. If there were no time delay and if the force were removed instantly at point G, the velocity would extend leftwardly on the horizontal line $T=$zero. However, due to time lags in the reaction control system of various magnitudes as illustrated by the separate curves a delay of .2, .4, .6, .8 and 1 second might occur. Taking the curve where $T=.2$, the attitude rate attains the value of about ten degrees per unit time. At the intersection of the horizontal line of ten degrees per unit time and the dashed line curve, opposite force should be applied.

The arrangement does not operate ideally and instead of following the optimum switching curve, the decrease in attitude rate due to the opposite thrust follows a curve to the left and has a value of about 6.5 degrees per unit of time at zero attitude error instead of zero attitude rate. Ideally, for zero attitude error, the attitude rate should also be zero.

Opposite thrust is maintained to decrease the attitude rate. At the point J, the curve $T=.2$ intersects a linear circle in dashed line similar to that in FIGURE 2. At this time of intersection, instead of on-off type of control, proportional control wherein the reactive force is made proportional to the algebraic sum of attitude and attitude rate is applied to more quickly reduce the attitude error and reduce the attitude rate to zero.

At point K on curve $T=.2$, the craft has "over shot" the desired attitude position but is at zero attitude rate. In order to return the craft to the desired attitude, the craft must have an opposite angular rate as represented by the ordinates under the curve KO as the craft is restored to its desired attitude. The initial overshoot can be reduced by changing the gain factor K in the optimum switching curve from the computed value based on only the system dynamics. This would lead the switching logic thereby compensating for the lag in the system.

While the curve KO is followed under operation of linear or proportional control, such curve following would not be effected for an on-off control. This may be readily appreciated by taking the on-off control from the point J on the curve $T=.2$. As the attitude rate decreases toward zero from point J, the attitude "overshoot" determined by the abscissae of curve JK continues to increase. It is apparent that such attitude overshoot continues to increase until the attitude rate changes sign. To get to O, a thrust continuing opposite to that of the initial thrust is required but this change in thrust direction occurred at H. This continues until attitude error and attitude rate fall on the switching curve at M and ideally the response should follow MO. Consequently in an on-off control, the portion KO of the response would not exist, instead the curve $T=.2$ would extend for example along a curve JM with a resulting substantial overshoot in attitude rate which increases to the optimum switching curve.

Eventually despite continued overshoot of attitude or attitude rate, the craft would attain the desired attitude at zero attitude rate.

In the proportional control arrangement, the magnitude of the reactive force is made proportional to the algebraic sum of attitude and attitude rate rather than being based on an on-off system. Thus at joint J on $T=.2$ the attitude rate which is of negative sign is high and the attitude error also negative in sign is small so that a large reaction force is applied tending to reduce attitude rate to avoid a large attitude error overshoot. As we progressed downward on the curve from point J, the algebraic sum of attitude and attitude rate decreases since rate is decreasing faster than attitude overshoot is increasing, so that as attitude rate decreases, the force tending to reduce attitude rate is decreasing.

At the point K, attitude rate is decreased to zero and attitude error is in excess. Consequently to reduce the negative attitude OK towards zero, a thrust in the direction corresponding to that applied for the initial attitude error occurs. This tends to provide the positive attitude rate as the negative attitude error is decreased. The negative attitude error and positive attitude rate are in opposition thereby decreasing thrust as attitude error is decreased to zero.

In the above consideration of attitude and attitude rate, the following signs have been observed: when the attitude error is clockwise or below that desired its signal is positive whereas when the attitude error is counter clockwise or above that desired its signal is negative; when the attitude rate is clockwise its signal is positive whereas when the attitude rate is counter clockwise its signal is negative.

Figure 4:
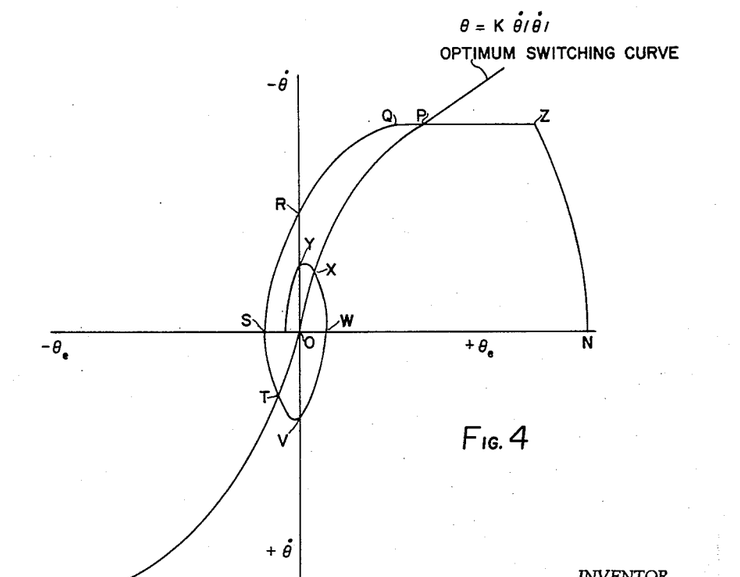
FIGURE 4 is a phase plane portrait of a history of a typical response to an attitude command.

A typical graphical illustration of the response of a system utilizing only on-off control and omitting the proportional control is illustrated in FIGURE 4. In FIGURE 4 beginning with an attitude error $\theta_e=N$, a reaction is applied in one direction about the axis of the member. The member accelerates until a velocity or angular rate, $\theta$, reaches the ordinate value at Z when the reactive thrust is shut off. The member continues to reduce attitude error, $\theta_e$, without increasing angular rate along the line ZP.

At the point P, thrust in the opposite direction of rotation is applied. Since this thrust requires a time to establish itself, no decrease in velocity or attitude rate is noted until point Q is attained consequently the attitude and attitude rate do not follow along the optimum switching curve OP. At point R, the member has attained zero attitude error but has still considerable negative attitude rate which is being reduced by the opposite reactive thrust.

At point S, the attitude rate is reduced to zero but a negative attitude error has been established.

The negative angular attitude error decreases while the positive attitude rate increases. At the point T on the optimum switching curve, what might be considered the clockwise thrust is terminated and counterclockwise thrust which is of the same direction as the initial thrust as point N is applied.

Due to the time lag, the thrust is not established until at point V whereupon the positive attitude rate decreases and the negative attitude error decreases to zero. The reactive thrust continues to decrease the positive attitude rate but sets up a positive attitude error. At point W, the positive attitude rate is zero whereas the positive attitude error has a significant value. The action continues in that the positive attitude error at point W similar to that at point N results in an increase in the negative attitude rate with switching over of the on-off reactive thrust at point X which is not established until point Y is attained.

Due to the lag such as that illustrated by PQ or XY, the attitude error and attitude rate do not follow the optimum switching curve. This results in considerable hunting about the origin O. In fact due to such time lag, the control actually continually hunts about the origin O and the rotatable member does not attain a quiescent zero attitude.

The advantage of the dual-mode of control of combining on-off with proportional is readily appreciated by comparing the response of FIGURE 4 to the response of the dual-mode system of FIGURE 5 where the time for the craft to attain the desired attitude is reduced since the curve $T=.2$ shows that but one attitude overshoot occurs whereas FIGURE 4 shows that several attitude overshoots occur. Additionally by the type of control having the response of FIGURE 5, a quiescent zero attitude is attained which is not provided by the system having the operation shown in FIGURE 4.

Figure 7:
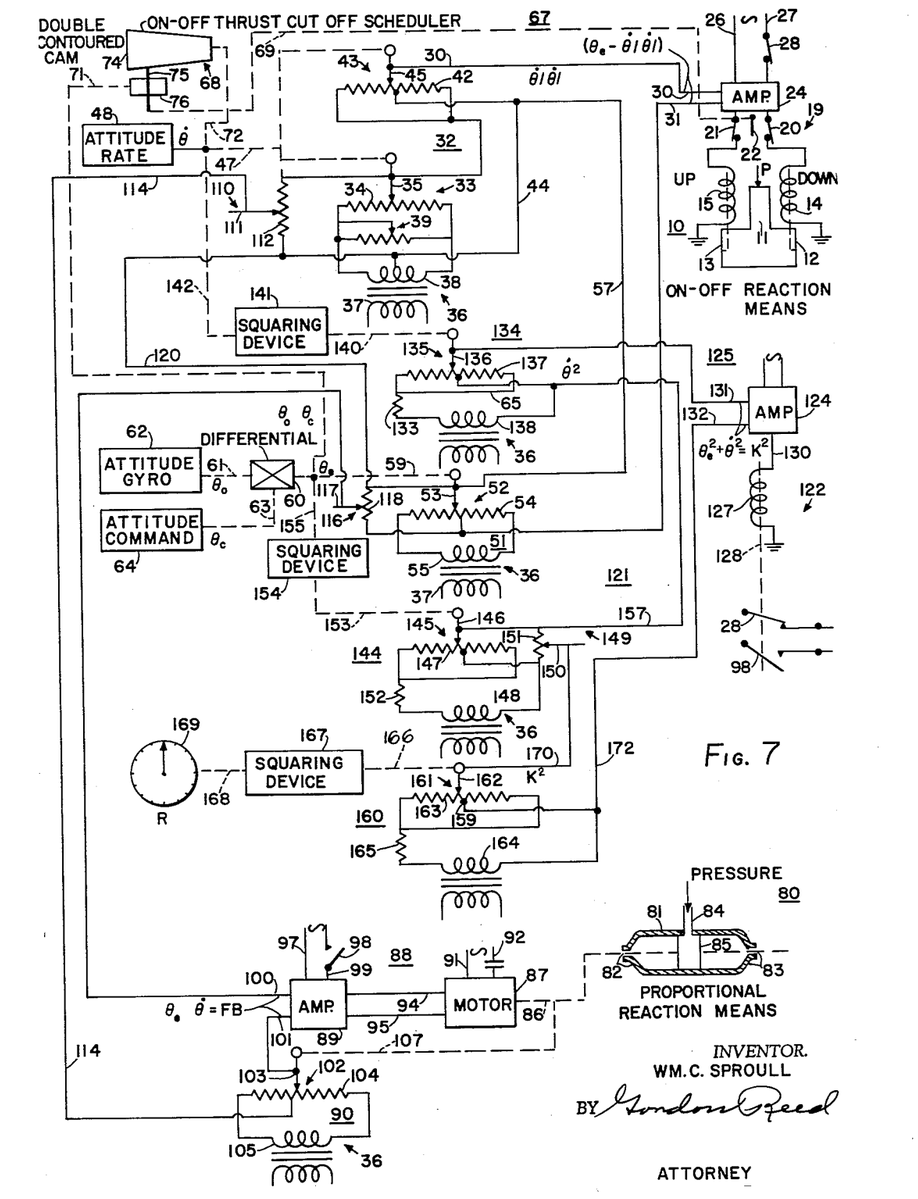
FIGURE 7 is a physical embodiment of the dual-mode system based on the phase plane of FIGURE 2.

A physical embodiment of the dual-mode system for obtaining the response as illustrated in FIGURE 5 will be described in detail with reference to FIGURE 7. In FIGURE 7, an on-off type reaction means 10 is adapted to apply a reactive force or thrust in either of two directions about an axis of the aircraft to be controlled to impart thereto rotational motion. The reaction means 10 develops a thrust from a supply source providing pressure through a conduit 11 from a pressure line "P." The reaction means 10 includes operable valves 12, 13 which may be alternatively operated to uncover ports or jets to release the air to derive a reactive thrust from its release.

The valves are respectively operated from an off to an on position by solenoid operating members 14, and 15. the valves communicate with suitable nozzles (not shown) for venting the discharge. The solenoids 14 and 15 are respectively energized through angular rate responsive switches 20 and 21 from an amplifier 24. The amplifier 24 energizes solenoids 14 or 15, during closures of switches 20 and 21, in accordance with the voltages satisfying a system response equation $\theta_e = K\theta|\theta|$. The amplifier 24 may be of the A.C. discriminator type and has its transformer (not shown) connected to an A.C. supply through conductor 26 on the one hand and conductor 27 and a series switch 28. The amplifier has A.C. control signals applied thereto from input signal conductors 30 and 31.

Voltage signals in accordance with one term of the control equation are derived from a signal generator 32 comprising a potentiometer 33 having a resistor 34 and adjustable slider 35. Resistor 34 is connected across a secondary winding 38 of a transformer 36 having a primary winding 37. In shunt with potentiometer resistor 34 is a ratio potentiometer or gain control 39 by which the constant K of the control equation is obtained. An output voltage is obtained on displacement of slider 35 relative to a center tap of winding 38.

Such center tap is connected by conductor 44 to a center tap of a second potentiometer resistor 42 of a potentiometer 43 having an adjustable slider 45 slightly displaced for clarity of showing from the center tap. Potentiometer 33 has its slider 35 connected by a conductor 41 to both ends of potentiometer resistor 42. Amplifier input conductor 30 extents to slider 45. Sliders 35 and 45 are operated together by the medium of suitable operating means 47 extending from an attitude rate sensing device 48. Such attitude rate sensing device may be a conventional rate gyroscope having two degrees of freedom and precessed about one axis in accordance with angular rate.

Signals in accordance with a second term of said system response equation or as now evident the optimum switching curve are supplied by an attitude error potentiometer 52 comprising an adjustable slider 53 and resistor 54. Resistor 54 is connected across a secondary winding 55 of the transformer having the primary winding 37. This arrangement is adopted since a single primary winding may supply a multiple number of secondary windings of a transformer. Amplifier input conductor 31 extends to a center tap of resistor 54 from which slider 53 is slightly displaced for clarity, and a conductor 57 extents from slider 53 to the center tap conductor 44 of resistor 42.

Slider 53 is displaced along resistor 54 from its center tap in accordance with the attitude error by suitable operating means 59 extending thereto from a differential 60. Differential 60 is of the conventional summing type having two inputs and an output. One input 61 is provided by an attitude sensing device 62 which may be a conventional horizon gyro for example having three degrees of angular freedom. A second input 63 to the differential is applied by an attitude command device 64. The device 64 may for example be a manually operable device to select a different attitude or may be some other device as well to perform the same function of determining an attitude.

It will be apparent in the above arrangement that signal generator 32 supplies signals in accordance with the value of $K\theta^2$ but with a sign varying with the direction of attitude rate or displacement of a slider 35 from a point on resistor 34 having the same potential as the center tap of winding 38 whereas signal generator 51 supplies a signal having positive or negative values dependent upon the attitude error or displacement of slider 53 from the center tap of resistor 54.

The arrangement of FIGURE 7 includes a velocity limit cutoff 67 comprising a switch assembly 19 having the individual single pole single throw switches 20, 21 and an operating means or arm 22 alternatively operating either switch 20, 21. The switch arm 22 is operated from an on-off thrust cutoff scheduler 68 through a suitable operating means 69. The scheduler 68 includes one input 71 positioned in accordance with attitude error $\theta_e$ and a second input 72 positioned in accordance with attitude rate $\theta$. The output from the scheduler 69 is connected to switch arm 22.

The scheduler 68 may be of any suitable electrical or mechanical type which will modify the operation of switch arm 22 not only in accordance with attitude rate but also in accordance with attitude error so that for large attitude errors, a higher attitude rate is permitted or attained before the switch actuating arm 22 engages one or the other of switches 20 and 21 to open the same and terminate application of initial thrust. The scheduler 68 may comprise for example a double contoured cam, that is one contoured radially in accordance with one of the above variables and axially in accordance with the other. The surface of the cam 74 may be engaged by a cam follower 75 which actuates the output member 69. The follower 75 is carried in an axially adjustable mount 76 positioned from the existing attitude error input member 71. The cam 74 may be rotated by the input member 72 in accordance with the existing attitude rate.

The individual switches 20 and 21 include "biasing means" (not shown) to normally hold them in the closed position shown. The operating means 69 may include biasing means so that the follower 75 always engages the periphery of the cam 74.

Having considered the arrangement for providing on-off control for the reaction means 10, the apparatus for providing proportional or linear control will now be described.

The proportional control system comprises a proportional reaction means 80 comprising a chamber 81 having oppositely facing ports or jets 82 and 83 which are controlled to supply a rotational thrust to the craft about an axis thereof. The ports 82 and 83 may be placed in communication with a source of pressure conduit 84 by a linearly adjustable valve 85. The valve 85 may be positioned in various extents through an operating means 86 by a motor 87.

Motor 87 comprises part of a proportional control servo mechanism 88 which additionally includes an amplifier 89 and a feedback signal generator 90 so that the output means 86 is positioned in accordance or in proportion to the algebraic sum of input control signals to amplifier 89.

The motor 87 may be a capacitor type induction motor having its rotor connected to operating means 86 and a field winding energized from an A.C. supply through conductor 91 on the one hand and conductor 92 and a phasing capacitor on the other. The motor includes an amplifier controlled winding connected through conductors 94 and 95 to the amplifier 89.

The amplifier 89 may be of the A.C. discriminator type and includes a transformer (not shown) having a primary winding connected at one end to an alternating voltage supply through a conductor 97 and connectable at its other end to the supply through a second conductor 99 and normally open switch 98. Input control signals are supplied to amplifier 89 through A.C. signal input conductors 100 and 101. The motor 87 operates in one or another direction to displace the control valve 85 from the closed position depending upon the phase relationship of the voltage across conductors 97 and 98 relative to the phase of the voltage across conductors 100 and 101. The extent of the displacement depends on the magnitude of the input signal.

Signals in accordance with one displacement term of the control equation $\theta + \dot{\theta} = FB$ for amplifier 89 are provided by the feedback signal generator 90 comprising potentiometer 102 having an adjustable slider 103 and resistor 104. Resistor 104 is connected across the secondary winding 105 of transformer 36. Slider 103 is displaced in either direction from a center tap of resistor 104 by suitable operating means 107 connected to the motor output member 86. Amplifier input conductor 101 extends to slider 103.

A second term of the control equation on amplifier 89 is provided through the attitude rate potentiometer 33 through a gain control potentiometer 110. Potentiometer 110 includes an adjustable tap 111 and a resistor 112. The resistor 112 is connected across the operable slider 35 and the center tap of secondary winding 38. The slider or tap 111 is adjusted so that for one degree of attitude rate a selected reactive thrust may be provided by displacement of valve 85 of the reaction means 80. A conductor 114 extends from adjustable tap 111 to the center tap of potentiometer resistor 104.

A third source of displacement control signal for the control equation on amplifier 89 is provided by attitude error signal generator 51 through a gain control potentiometer 116. Potentiometer 116 includes an adjustable tap 117 and a resistor 118. Resistor 118 is connected across adjustable slider 53 and the center tap of potentiometer resistor 54. The tap 117 may be adjusted so that for one degree of attitude error a selected displacement of valve 85 results thus selected thrust may be obtained from reaction means 80. Amplifier input conductor 100 extends to adjustable tap 117 and an interconnecting conductor 120 extends from one end of resistor 118 to one end of voltage dividing resistor 112.

It will thus be evident that the servo mechanism 88 is a follow-up system wherein the valve 85 is positioned in accordance with the algebraic sum of attitude error and attitude rate. The reaction means 80 is such that for full displacement of valve 85, to fully communicate pressure conduit 84 with one or the other ports 82 and 83, maximum output thrust is obtained but such output thrust is considerably less than the full output thrust obtained from reaction means 10.

The introduction of proportional control and the disabling of on-off control when the attitude rate and attitude error fall within the "linear circle" of FIGURE 2 is provided by a switching arrangement 121 FIGURE 7 comprising an operable relay 122, a switching amplifier 124, and an amplifier control circuit 125.

Relay 122 includes an operable winding 127 which positions an armature 128 to operate arm 28 of a normally closed switch and arm 98 of a normally open switch. The winding 127 is energized through an output conductor 130 of amplifier 24.

The amplifier 124 energizes winding 127 in accordance with the control equation $\theta_e^2 + \dot{\theta}^2 = R^2$ so that when the sum of the squares of attitude and attitude rate equal or are less than the square of a selected quantity the winding 127 will be energized.

Amplifier 124 may be an A.C. discriminator type having supply conductors connected to an A.C. source and A.C. input conductors 131 and 132. The input conductors are connected to a control circuit 125 which in the present embodiment includes three sources of control voltage.

One source of voltage is provided by a signal generator 134 which includes a potentiometer 135 having an adjustable slider 136 and resistor 137 with the slider for clarity slightly displaced from the center of resistor 137. The signal generator includes a secondary winding 138 of transformer 36. One end of transformer winding 138 is connected through a resistor 133 to both ends of potentiometer resistor 137. The opposite end of winding 138 is connected to a center tap of potentiometer resistor 137. Slider 136 is positioned in either direction from its normal position at the center tap by a suitable operating means 140 extending thereto from a squaring device 141. The input to the squaring device is operated by a suitable operating means 142 in accordance with attitude rate from the attitude rate device 48. By means of the connections of potentiometer 135 to secondary winding 138 a signal having an instantaneous voltage of but one phase is obtained irrespective of the displacement of slider 136 relative to its resistor center tap.

The squaring device 141 is such that for a given linear attitude rate input on 142, the output member 140 is positioned in accordance with the square of such input. Such conversion may be effected by a suitable square law cam or other suitable means. Amplifier input conductor 131 extends to slider 136.

A second source of control voltage is supplied by signal generator 144 which includes a potentiometer 145 having an adjustable slider 146 and resistor 147, a secondary winding 148 of transformer 36, and a voltage dividing or gain control potentiometer 149. Secondary winding 148 has one end connected through a series resistor 152 to both ends of potentiometer resistor 147. The opposite end of secondary winding 148 is connected to a center tap of resistor 147. Voltage divider 149 includes a resistor 151 which is connected across slider 146 and the center tap of potentiometer resistor 147. The voltage divider 149 includes an adjustable tap 150. Slider 146 may be displaced in either direction from normal position at the center tap on resistor 147 by an operating means 153 extending thereto from a "squaring device" 154 which receives an input on operating means 155 in accordance with attitude error from differential 60. The potentiometer 145 thus is so arranged that regardless of the direction of attitude error, and thus independent of the direction of displacement of slider 146 from its center tap, at the time of consideration in the A.C. potentiometer an instantaneous single phase voltage will be provided by signal generator 144. Slider 146 is connected by conductor 157 to the center tap of potentiometer resistor 137.

The single circuit includes a third signal generator 160 comprising a potentiometer 161 having an adjustable slider 162 and resistor 163 and a secondary winding 164. One end of secondary winding 164 is connected through a series resistor 165 to both ends of potentiometer resistor 163 and the opposite end of winding 164 is connected to a center tap 159 of resistor 163. Slider 162 may be displaced in either direction from center tap 159 by a suitable operating means 166 extending thereto from a squaring device 167 having an input 168 positioned in accordance with a selected R value for the circle from a selector 169. Slider 162 is connected through conductor 150 to adjustable tap 170 whereas center tap 159 is connected through conductor 172 to amplifier input conductor 132.

In the control equation for switching amplifier 124, the voltages representing $\theta_e^2$ and $\theta^2$ are of the same phase and are opposed to the phase of the voltage from signal generator 160. Thus when $R^2$ is greater than the sum of $\theta_e^2$ plus $\theta^2$ amplifier 124 is energized and energizes relay winding 127 opening switch member 28 and closing switch member 98 thus disabling the on-off reaction control means 10 and establishing the proportional control from servo mechanism 88.

While FIGURE 7 discloses in detail an embodiment which has as its switching function the optimum control curve of FIGURE 2, a modification has also been provided which uses a straight line as a switching function.

Figure 3:
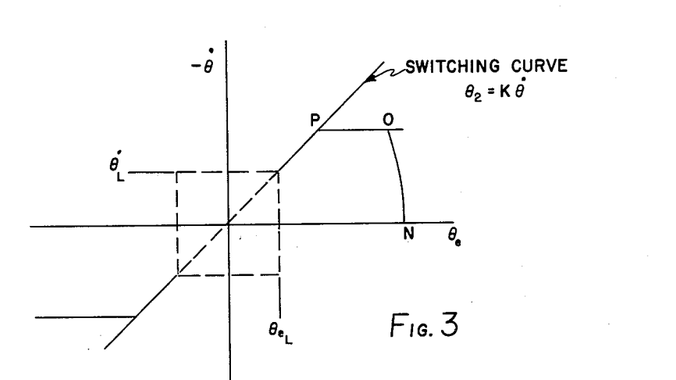
FIGURE 3 is a phase plane portrait of the operation of the dual-mode system on such body under a different phase plane portrait.

A system performance or response using a linear or straight line switching function for on-off control and a geometrical figure, such as a square rather than a circle, to determine switching over from on-off to proportional control is shown in FIGURE 3. In FIGURE 3, attitude error again is the abscissae and attitude rate is the ordinate. Attitude errors to the right of the origin are positive and to the left negative; attitude rates above the origin are negative and attitude rates below the origin are positive. The expression for the straight line is $\theta_e = K\theta$ so that the slope of the line will be determined by the selected value of K.

The shape of the figure which determines when control is changed from on-off to proportional is illustrated as a parallelogram wherein the extreme values of attitude error are defined by a $\theta_L$ or limiting attitude whereas the limiting ordinate is defined by $\dot{\theta}_L$ or limiting rate. Thus a transfer from on-off to proportional control is obtained whenever the simultaneous values of attitude error and attitude rate are respectively but separately less than $\theta_L$ and $\dot{\theta}_L$.

Figure 8:
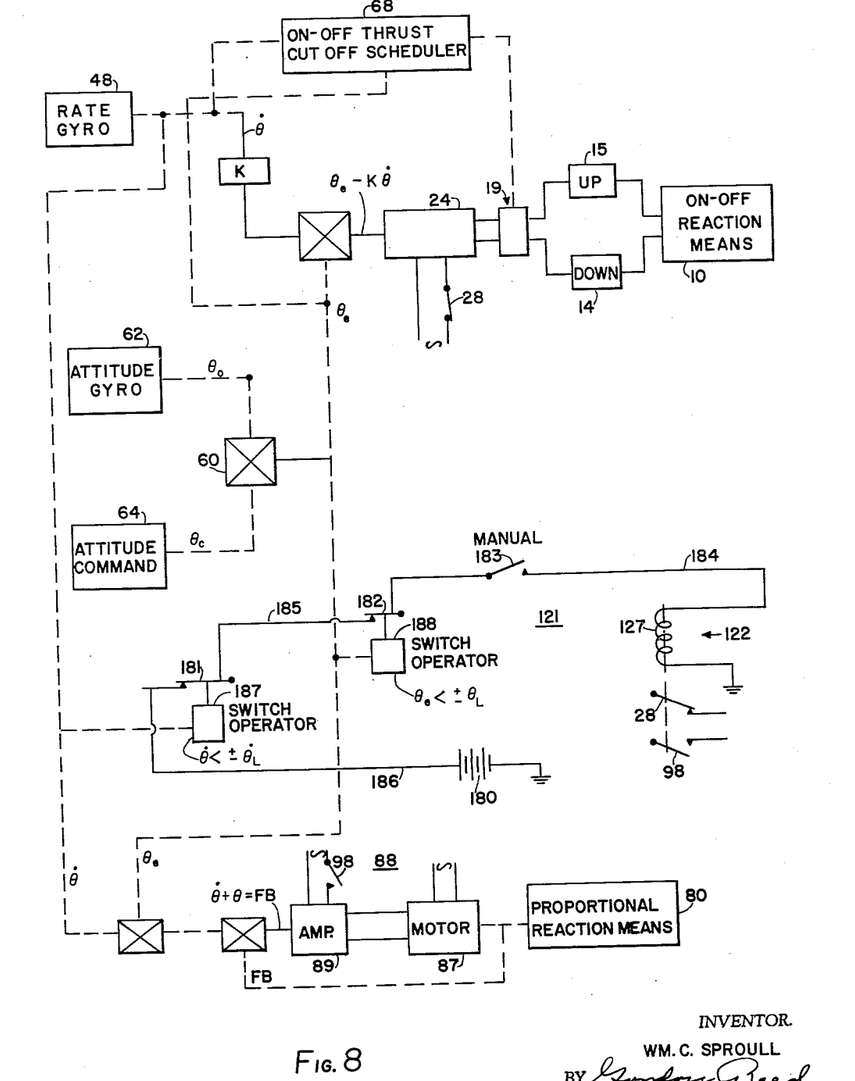
FIGURE 8 is a physical embodiment of the dual-mode control system utilizing the phase plane of FIGURE 3.

A schematic embodiment of a system functioning both with a linear rather than parabolic switch line and a parallelogram rather than a circular changeover figure from on-off to proportional is illustrated in FIGURE 8. Parts similar to that utilized in FIGURE 7 bear the same reference character. As inferred, the on-off control amplifier 24 responds to the control equation $\theta_e = K\theta$. The quantity $\theta_e$ = attitude error and is obtained through the attitude gyro 62 and the attitude command device 64 through summing differential 60. The quantity $K\theta$ is obtained from rate gyro 48, sensing attitude rates, and through a gain control K. The summation of the two quantities is represented by a differential which implies algebraic summing of the attitude error and attitude rate signals.

Depending upon whether attitude error $\theta_e$ or $K\theta$ is greater absolutely, the amplifier 24 through the switching device 19 and solenoids 14 or 15 controls the on-off reaction means 10 to impart a thrust. A velocity cutoff scheduler 68, scheduled in accordance with attitude rate and attitude error, terminates the application of the first thrust. An opopsite thrust is obtained when the control equation goes to the opposite sign on amplifier 24 which occurs for example at the point P in FIGURE 3.

As in FIGURE 7, a proportional servo mechanism 88 is provided in FIGURE 8 to supply proportional reaction control. The switchover from on-off to proportional control is provided through switching means 121, the switch means 121 controls the energization of winding 127 of relay 122 through a circuit comprising a battery 180, conductor 186, switch 181, conductor 185, switch 182, manually operable switch 183, conductor 184, winding 127 to ground and return to battery ground. Switch 181 includes a switch operator 187 which closes the switch whenever $\dot{\theta}$ is less than plus or minus attitude rate limit, $\dot{\theta}_L$. Switch 182 is positioned by a switch operator 188 so that the switch 182 is closed whenever $\theta_e$ is less that plus or minus attitude limit, $\theta_L$. Thus in order for the relay winding 127 to be energized both switches 181 and 182 must be in closed condition simultaneously although not necessarily simultaneously closed. Upon energization of relay 122, switch 98 is closed to connect amplifier 89 of servo mechanism 88 to A.C. supply and opening the switch 28 disconnects amplifier 24 from the A.C. supply.

*Operation*

The operation of the embodiment in FIGURE 7 while generally understood from the description thus far, will be reviewed, keeping in mind in view of FIGURE 2 that attitude errors to the right of the origin are positive and to the left negative and attitude rates above the origin are negative and those below the origin are positive.

By referring to FIGURE 5, assume a positive attitude error of 44 degrees. Such attitude error is derived from attitude gyro 62 and attitude command device 64 which may command the above attitude change while the attitude gyro indicates zero error. The differential operation of device 62 and device 64 develops an error signal from signal generator 51 which is applied to the control circuit of amplifier 24. Amplifier 24 by its energization with switch 28 closed energizes solenoid 15 which positions valve 13 of reaction means 10 to apply an up reactive force.

With the initial attitude rate zero, the attitude rate increases up to the point G when the on-off thrust cutoff scheduler 68 through switch actuator arm opens switch 21 of switch assembly 19 terminating energization of solenoid 15. The reactive thrust is removed permitting the aircraft to coast without increasing angular velocity.

While the aircraft attitude error decreases along the horizontal line $T = .2$ to point H, during such decrease in attitude, the unbalance in the control equation on amplifier 24 becomes less until at point H any further decrease in attitude at the existing attitude rate will result in opposite unbalance of the control circuit of amplifier 24. Such unbalance would energize solenoid 14 which through operating valve 12 applies an opposite reactive thrust tending to decrease the aircraft angular velocity. Since the angular velocity is decreasing, the cutoff scheduler 67 moves the arm 22 so that switch 21 of switch assembly 19 may close itself.

When the attitude rate in FIGURE 5 reaches the value of 6.5 degrees per second, the aircraft is at the desired attitude with no attitude error, but it still has an attitude rate. It is thus evident that the attitude of the craft will be carried beyond the desired attitude or an attitude overshoot will occur.

At the point J, the switching amplifier 124 energizes relay 122 opening switch 28 to disable on-off amplifier 24 thus deenergizing solenoid 14 resulting in closing of valve 12 to remove all on-off reactive thrusts.

The energization of relay 122 also closes switch 98 whereby amplifier 89 is connected to a voltage supply. At the point J, attitude error is slightly negative and attitude rate is also negative so that a large unbalance occurs on proportional control amplifier 89. The amplifier 89 energizes motor 87 to position control valve 85 in accordance with such magnitude of unbalance and the amplifier input circuit is rebalanced by the feedback potentiometer 102.

It is apparent from the curve in FIGURE 5 that the decrease in attitude rate is much faster than the gain in attitude error, consequently a smaller negative input control signal appears on amplifier 89. The feedback signal exceeds the input signal and causes the motor 87 to move valve 85 back toward its normal position. Attitude rate continues to decrease until it is zero.

The applied thrust since it has decreased the attitude rate to zero continues to be applied in the same direction since attitude error apparently is negative. However, as attitude rate goes from zero to positive, its sign is of opposite phase from that of negative attitude, consequently the unbalance of amplifier 89 is of such direction as to cause the application of thrust tending to decrease positive angular rate. While such positive angular rate decreases, the negative attitude error also decreases along the curve KO and the craft attains a zero attitude error and zero attitude rate at the desired attitude.

While the apparatus has been described when an initial positive attitude error signal occurred, the apparatus also will function when the initial attitude error is negative. However, in such instance, an overshoot resulting in both a positive attitude error and a negative angular rate occurs which are reduced to zero in a portion of the curve appearing in the first rather than in the third quadrant.

The arrangement of FIGURE 8 operates in a similar manner to that of FIGURE 7 except that instead of having a parabolic optimum on-off switching curve, a linear switching line is provided and switch over from on-off to proportional control is determined by magnitudes of $\theta_e$ and $\theta$ defining a parallelogram rather than defining magnitudes of a circle $\theta_e^2$ and $\theta^2$.

It will now be apparent that there has been provided a novel dual-mode automatic reaction flight control apparatus utilizing the best features of on-off and proportional control for an aircraft flying at very low dynamic pressures. Although two embodiments of the invention have been disclosed, it will appear from the above disclosures that other embodiments of the invention may be provided without departing from the spirit thereof. It is therefore desired that the invention be not limited to the precise embodiments disclosed but as defined by the following claims.

What is claimed is:

1. Attitude control apparatus for an aircraft having reaction means for applying a thrust to change angular acceleration of the aircraft, in combination: first signal means including attitude responsive means to provide an attitude error signal, $\theta_e$; operating means controlled thereby and controlling said reaction means to apply a substantial thrust in one direction to accelerate said craft about an axis; angular rate responsive means effective at a predetermined angular rate, $\theta$, controlling said reaction means to prevent further thrust therefrom whereupon said aircraft continues to change attitude without increasing attitude rate; means including said first signal means and responsive to the algebraic sum of attitude error, $\theta_e$, and the product of attitude rate and the absolute magnitude of attitude rate, $\theta|\theta|$, and effective when the sum is of opposite sign from $\theta_e$ to control other reaction means to provide opposite thrust to said aircraft, thereby oppositely accelerating said aircraft causing a decrease in its attitude rate during decrease of said attitude error.

2. The apparatus of claim 1, means for deriving a second signal in accordance with the second power of angular rate, $(\theta^2)$; means deriving a third signal in accordance with the second power of attitude error, $\theta_e^2$; and summing means controlled by said second and third signals for operating reaction means substantially in accordance with the algebraic sum of the attitude error, $\theta_e$ and the attitude rate, $\theta$.

3. Attitude control apparatus for an aircraft having on-off and proportional reaction means for applying a thrust in either of two directions transverse to the longitudinal axis of the craft to change angular acceleration of the craft about a second axis at an angle to said longitudinal axis, in combination: means including attitude responsive means to provide an attitude error signal; operating means controlled thereby and controlling said on-off portion of said reaction means to apply a substantial first thrust to accelerate said craft about said second axis; angular rate responsive means; means responsive to the algebraic sum of the attitude error, $\theta_e$, and the product of attitude rate and the absolute magnitude of attitude rate, $\theta|\theta|$, and effective when the sum has a sign opposite from that of $\theta_e$ to further control the on-off reaction means to provide a substantial but opposite directed thrust to said aircraft from said first thrust about said second axis thereby oppositely accelerating said aircraft to decrease its attitude rate during decrease of said attitude error; means for deriving a signal in accordance with the second power of angular rate, $(\theta)^2$; means deriving a signal in accordance with the second power of attitude error, $\theta_e^2$; and summing means controlled thereby for preventing operation of said on-off reaction means and thereafter controlling said proportional reaction means in accordance with the algebraic sum of the attitude error, $\theta_e$, and attitude rate, $\theta$.

4. The apparatus of claim 3, and means responsive to said attitude rate device controlling said on-off reaction means to prevent further application of the first thrust therefrom whereupon said aircraft continues to change attitude without increasing attitude rate.

5. Attitude control apparatus for an aircraft operated in rarified air and having on-off reaction means for applying a full thrust in either of two directions transverse to a first axis of the aircraft to change angular acceleration of said craft about a second axis at an angle to said first axis, in combination: means including attitude responsive means responsive to position about said second axis to provide an attitude error signal; operating means controlled thereby and controlling said reaction means to apply a substantial thrust to accelerate said craft about said second axis; craft angular rate responsive means, and further means controlled by said rate responsive means and effective at a predetermined rate about said second axis and controlling said operated reaction means to prevent further thrust therefrom, whereupon said aircraft continues to change attitude about said second axis without increasing attitude rate.

6. The apparatus of claim 5 and means for also modifying the response of said further means to said rate responsive device in accordance with attitude to delay the point of thrust cutoff, to thereby also alter the ultimate attitude rate in accordance with the magnitude of attitude error.

7. The apparatus of claim 6, means responsive to the algebraic sum of the attitude error, $\theta_e$, and the product of attitude rate and absolute magnitude of attitude rate, $\theta|\theta|$ and effective when the latter product exceeds the attitude error and is of opposite sign to control another reaction means to provide opposite thrust about said second axis of said aircraft thereby oppositely accelerating said craft to decrease its attitude rate during decrease of said attitude error.

8. The apparatus of claim 7, means for deriving a signal in accordance with the second power of angular rate; means deriving a signal in accordance with the second power of attitude error; and further means including summing means controlled by said last two named signals for terminating operation of said reaction means from said first and second reaction means and providing a further reactive effect in either direction about said second axis in accordance with the algebraic sum of attitude error and attitude rate.

9. The apparatus of claim 7, and means for deriving a signal variable in accordance with the second power of angular rate; means deriving a signal in accordance with the second power of attitude error; and means including a summing means controlled by said last two named signals for preventing further operation of said first and second reaction means; a servo mechanism for producing a proportional reactive effect about said second axis; and means controlling said servo mechanism in accordance with the craft attitude rate, attitude error, and extent of operation of said servo mechanism.

10. The apparatus of claim 2, and gain control means for said angular rate and attitude error signals applied to said last named summing means.

11. Attitude control apparatus for an aircraft operated in rarified air and having reaction means for applying a thrust in either direction about an axis to change angular acceleration of the aircraft about said axis, in combination: control means including attitude responsive means to provide an attitude error or first signal; on-off operating means responsive to said first signal and controlling said reaction means to obtain a substantial thrust therefrom to accelerate said craft about said axis; craft angular velocity responsive means effective at a predetermined angular velocity controlling said operated reaction means to prevent further thrust therefrom; on-off switching means combining craft angular velocity or second signal, due to said acceleration, and said first signal and effective when the former exceeds the latter in magnitude to control said operating means to cause opposite thrust from said reaction means to cause decrease in angular velocity; proportional control means effective when both attitude error and attitude rate are within predetermined magnitudes rendering said on-off operating means ineffective and alternatively controlling said reaction means proportional to the algebraic sum of attitude error and attitude rate signals.

12. Attitude control apparatus for an aircraft operated in rarified air and having reaction means for applying a thrust in either direction about an axis to change angular acceleration of the aircraft about said axis, in combination: control means including attitude responsive means to provide an attitude error signal; on-off operating means responsive to said signal and controlling said reaction means to obtain a substantially large thrust therefrom to accelerate said craft about said axis; craft attitude error rate responsive means effective at a predetermined rate controlling said operated reaction means to prevent further thrust therefrom; attitude rate means modifying said control means to apply an opposite reactive thrust; proportional control means for applying a reactive thrust having different magnitudes dependent upon the algebraic sum of attitude error and attitude rate; and further switch means when said attitude error and attitude rate are within predetermined magnitudes rendering said on-off operating means ineffective and rendering the proportional control means effective thus introducing proportional control.

13. Attitude control apparatus for an aircraft having flight control moment means for applying a control moment to change angular acceleration in combination: means including attitude responsive means to provide an attitude error signal; operating means controlled thereby and controlling said control moment means to apply a substantial control moment to accelerate said craft about an axis; angular rate responsive means effective at a predetermined rate during decrease in the attitude error additionally controlling said operating means to prevent further increase in attitude rate; and means responsive to the algebraic sum of attitude error and the product of attitude rate and the absolute magnitude of attitude rate and effective when the sign of such sum is opposite to the sign of the attitude error to apply an opposite control moment to said aircraft thereby oppositely accelerating said aircraft and thus decreasing the attitude rate during decrease of said attitude error.

14. The apparatus of claim 13, and means for deriving a signal in accordance with the second power of angular rate; means deriving a signal in accordance with the second power of attitude error; and summing means controlled thereby and when the sum of the squares is less than the square of a selected quantity for applying only control moments proportional to attitude error, attitude rate, and the control moment.

15. Condition control apparatus comprising: means providing a variable magnitude error signal varying with the change in said condition from datum; an on-off condition changing means responsive to said signal thereby obtaining a constant high rate of change of said condition; proportional control means providing a rate of change in condition varying with the sum of the magnitude of the error and rate of change of error; and means effective when said magnitude error signal and error rate signal are within predetermined magnitudes rendering said on-off condition changing means ineffective and rendering the proportional control means effective.

16. Attitude control apparatus for an aircraft having reaction means for applying a thrust in either direction about an axis to change angular acceleration of the craft about said axis, in combination: control means including attitude responsive means to provide an attitude error or first signal; on-off operating means responsive to said signal and controlling said reaction means to obtain a substantial thrust therefrom to accelerate said craft about said axis; further means in said control means responsive to craft angular velocity, due to said acceleration, to cause opposite thrust from said reaction means in accordance with a functional relationship between the variables of attitude error and craft angular velocity; and proportional control means effective when magnitudes of the variable quantities attitude error and craft angular velocity jointly satisfy a predetermined condition rendering said on-off operating means ineffective and alternatively controlling said reaction means proportional to the algebraic sum of attitude error and attitude angular rate.

17. Attitude control apparatus for an aircraft having reaction means for applying a thrust in either direction about an axis to change angular acceleration of the craft about said axis, in combination: on-off operating means controlling said reaction means to obtain a substantially large thrust therefrom to accelerate said craft about said axis; attitude error responsive signal means; attitude error rate responsive signal means; control means responsive to both signal means and controlling said on-off operating means to apply a thrust in one direction or the other about said axis in accordance with the value of a first function of said signals; proportional control means for applying a reactive thrust about said axis and having different magnitudes dependent upon the algebraic sum of attitude error and attitude error rate; and further means effective when a second function of the variable quantities attitude error and attitude error rate satisfy a predetermined condition rendering said on-off operating means ineffective and rendering the proportional control means effective thus introducing proportional control.

18. Attitude control apparatus for an aircraft having reaction means for applying a thrust in either direction about an axis to change angular acceleration of the aircraft about said axis, in combination: control means including attitude responsive means to provide an attitude error or first signal; on-off operating means responsive to said signal and controlling said reaction means to obtain a substantial thrust therefrom to accelerate said craft about said axis; switching means responsive to craft angular velocity, due to said acceleration, and to attitude error and effective to control said reaction means to cause opposite thrust from said reaction means to cause decrease in angular velocity of the craft about said axis; proportional control means effective when both attitude error and attitude rate are within predetermined magnitudes rendering said on-off operating means ineffective and alternatively controlling said reaction means proportional to the algebraic sum of attitude error and attitude rate; and further means responsive to the angular velocity of the craft about said axis to terminate said initial thrust from said reaction means whereby the craft changes attitude without increasing angular velocity.

19. The apparatus of claim 18, with additional means for modifying the velocity at which initial thrust is terminated in accordance with the magnitude of attitude error.

References Cited in the file of this patent
UNITED STATES PATENTS

| | | |
|---|---|---|
| 2,222,886 | Voigt | Nov. 26, 1940 |
| 2,644,397 | Katz | July 7, 1953 |
| 2,823,877 | Hess | Feb. 18, 1958 |